Dec. 26, 1944.     F. G. R. MAGNUSSON     2,365,714
CONTINUOUS ELEVATOR
Filed Dec. 27, 1941     2 Sheets-Sheet 1

Folke Gösta Robert Magnusson
INVENTOR
By (signature)
his ATTY.

Dec. 26, 1944.    F. G. R. MAGNUSSON    2,365,714
CONTINUOUS ELEVATOR
Filed Dec. 27, 1941    2 Sheets-Sheet 2

Folke Gösta Robert Magnusson
INVENTOR
his ATTY.

Patented Dec. 26, 1944

2,365,714

UNITED STATES PATENT OFFICE 2,365,714

CONTINUOUS ELEVATOR

Folke Gösta Robert Magnusson, Stockholm, Sweden

Application December 27, 1941, Serial No. 424,594
In Sweden September 19, 1940

2 Claims. (Cl. 198—140)

In many working processes it is necessary to convey material from one step of the process that is more or less discontinuous to a subsequent continuously working step. In such case the conveyor must possess a certain accumulating power so as to equalize the variations of the quantity arriving at the conveyor so that the quantity delivered by the conveyor will be constant.

An instance of a working or manufacturing process in which there is such a need, is the manufacture of concentrated fodder by means of artificial drying of grass. In order to obtain the most even product the green grass is cut before the drying into small pieces in a chaff-cutting machine, whereafter the chaff is fed into a drier and dried. The grass current coming from the cutting machine is never even, i. e. the quantity of delivered material varies per unit of time, an equalization being necessary while conveying the chaff to the drier, since the drying result depends largely upon a constant feeding of material to the drier.

The present invention relates to a device enabling an equalization of this kind.

The invention is substantially characterized by the fact that for feeding the material an endless conveyor or the like is used, on the inside of which the material is conveyed.

The invention is diagrammatically illustrated in the accompanying drawings which exemplify one embodiment of the invention, and in which Fig. 1 shows a vertical section through the middle of a device according to the invention, and Fig. 2 shows a section taken on the line II—II in Fig. 1.

Figure 1:
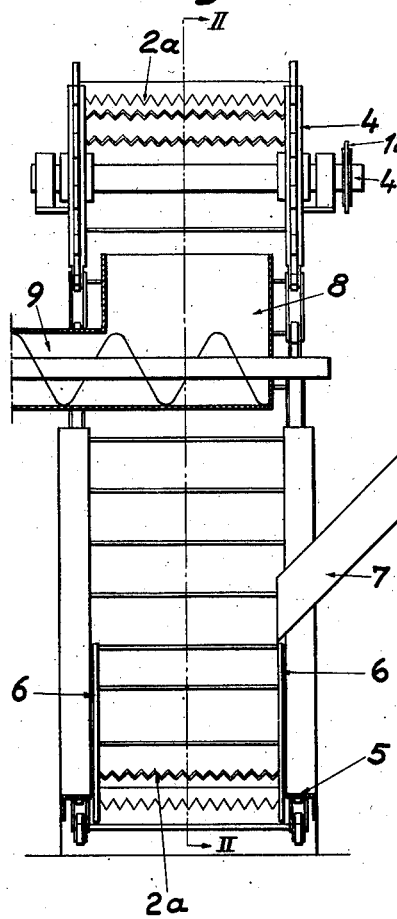
Figure 2:
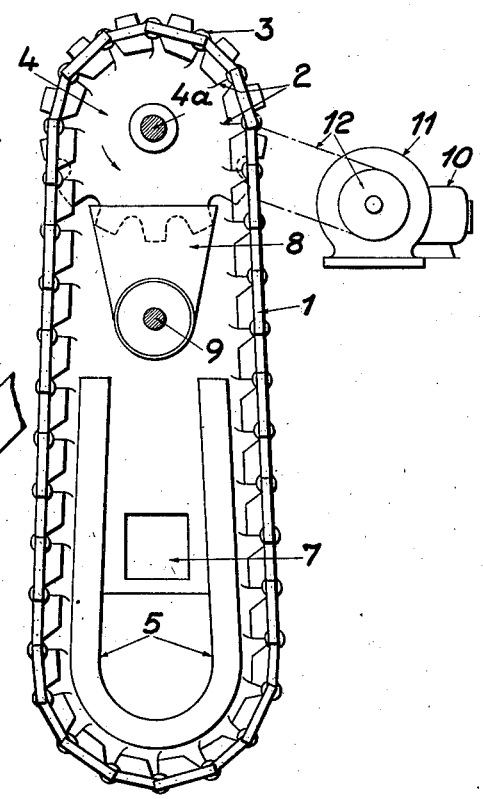
Figure 4:
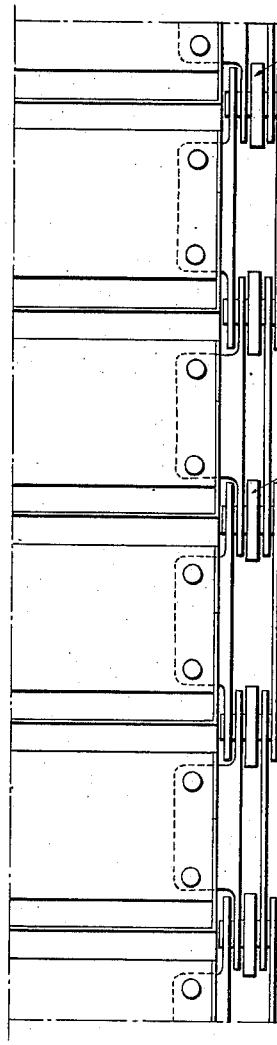
Fig. 4 is an enlarged plan view of part of the conveyor.
Figure 3:
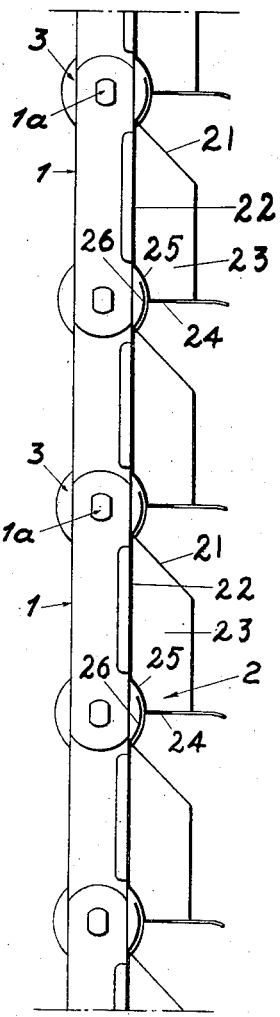
Fig. 3 is an enlarged side elevation of part of the conveyor shown.

In the drawings, the endless conveyor is shown as a chain conveyor of generally known construction including two chains with links 1 and antifriction rollers 3 on the link pins 1a. The chains are carried and driven by sprocket wheels 4 mounted on a shaft 4a and guided by tracks 5 to travel in a path comprising arcs joined by ascending and descending runs. According to the invention, the conveyor is provided on its inside with buckets 2 extending from one chain to the other and mounted on the chain links. Each bucket 2 is open at its front 21 and has a bottom 22, two side walls 23, a rear wall 24, and a curved connecting portion 25 extending upwardly and rearwardly from the rear edge of said bottom 22 to the lower edge of said rear wall 24. The front end of each bottom is provided with a curved lip 26 which underlaps the curved connecting portion 25 of the preceding bucket 2 to a lesser extent when both said buckets 2 traverse the ascending and descending runs of the conveyor path and to a greater extent when said buckets 2 traverse the arcs of the conveyor path. In the lower arc of the conveyor path, there are provided two side plates 6, said plates and the buckets 2 which happen to traverse said lower arc cooperating to form a substantially closed trough in which material entering through the chute 7 can be collected and from which the successive buckets remove uniform quantities of material. The rear wall 24 of each bucket 2 projects beyond the plane including the free edges of the side walls 23 and is provided with tooth-shaped cutouts 27 to a depth below said plane. The conveyor may be driven by an electric motor 10 via a gear device 11 and transmission means 12. When the conveyor is put into motion the buckets take part of the material collected in the pocket and lift it to a height determined by the distance between the turning centers of the conveyor. When the chains round the sprocket wheels 4 the buckets can no longer hold the material, which now falls down into a box 8. From this box it is fed further by means of a screw conveyor 9 which may be driven from the same motor 10 as the conveyor 1. The speed of the endless conveyor, may be varied by means of a variable speed transmission (for example such one which is shown in the U. S. patent specification No. 2,157,758). A variable speed transmission for varying the speed of the screw conveyor may be used too. Along the edges of the plates or walls 6 contacting with the edges of the conveyor there are provided tightening means so as to prevent material from leaking out between the conveyor and the walls.

Having now described my invention, what I claim as new and desire to secure by Letters Patent is:

1. In a continuous elevator comprising an endless conveyor arranged to travel in a path consisting of arcs joined by ascending and descending runs and side plates mounted in the lower arc of said conveyor path, the combination of a series of buckets mounted on the inside of said conveyor, each of said buckets being open at its front and having a bottom, a rear wall, a curved connecting portion extending upwardly and rearwardly from the rear edge of said bottom to the lower edge of said rear wall, a curved lip at the front end of said bottom underlapping the curved connecting portion of the preceding bucket to a lesser extent when the corresponding buckets traverse the ascending and descending runs of the conveyor path and to a greater extent when said buckets traverse the arcs of the conveyor path, and parallel side walls terminating near the line where the bottom merges into said lip and being cut away on an oblique upwardly and rearwardly extending plane.

2. A continuous elevator combination, as claimed in claim 1, in which the rear wall of each bucket projects beyond the plane including the free edges of the corresponding side walls, and is provided with tooth-shaped cut-outs to a depth below said plane.

FOLKE GÖSTA ROBERT MAGNUSSON.